United States Patent [19]
Matsuda et al.

[11] Patent Number: 6,095,590
[45] Date of Patent: Aug. 1, 2000

[54] WINDBREAK AERO-BOARD APPARATUS FOR OPEN-TOP VEHICLE

[75] Inventors: Hiroyuki Matsuda; Hiroyuki Kihara; Minoru Nakamura, all of Hiroshima, Japan

[73] Assignee: Mazda Motor Corporation, iroshima, Japan

[21] Appl. No.: 09/050,936

[22] Filed: Mar. 31, 1998

[30] Foreign Application Priority Data

Mar. 31, 1997 [JP] Japan ................................... 9-080818

[51] Int. Cl.⁷ .......................................................... B60J 1/00
[52] U.S. Cl. .......................................... 296/180.1; 296/85
[58] Field of Search ................................ 269/180.1, 85

[56] References Cited

U.S. PATENT DOCUMENTS

| | | | |
|---|---|---|---|
| 5,201,565 | 4/1993 | Berardino | 296/136 |
| 5,318,337 | 6/1994 | Gotz et al. | 296/85 |
| 5,338,089 | 8/1994 | Gotz et al. | 296/85 |
| 5,738,404 | 4/1998 | Stadler et al. | 296/180.1 |
| 5,743,589 | 4/1998 | Felker | 296/180.1 |

FOREIGN PATENT DOCUMENTS

45372  2/1992  Japan .

*Primary Examiner*—D. Glenn Dayoan
*Assistant Examiner*—Lori L. Coletta
*Attorney, Agent, or Firm*—Nixon Peabody LLP; Donald R. Studebaker

[57] ABSTRACT

An windbreak aero-board apparatus disposed behind a passenger seat of an open-top vehicle for protecting a passenger on the seat from a swirling wind blast is comprised of a lower shield member transversely extending and secured to opposite sides of the vehicle body and an upper shield member transversely extending in the vehicle body which is connected to the lower shield member so as to turn up and down between an upright position in which the upper shield member stands up on top of the lower shield member and a retracted position in which the upper shield member is placed below the top of the lower shield member.

6 Claims, 7 Drawing Sheets

WINDBREAK AERO-BOARD APPARATUS FOR OPEN-TOP VEHICLE

BACKGROUND OF THE INVENTION

1. Technical Field of the Invention

The present invention relates to an open-top vehicle body, and, more particularly, to an open-top vehicle body equipped with a foldable windbreak apparatus placed behind a passenger seat for preventing a strong wind from blowing into a passenger compartment even while the vehicle is traveling at a high speed.

2. Description of the Prior Art

Open-top or so called cabriolet type vehicles are typically provided with a foldable hood structure which can be folded and unfolded between an unfolded position in which the foldable hood covers the top of the vehicle and a folded position in which the foldable hood is concealed in a rear section of the vehicle to open the top of the vehicle. In the unfolded position, the foldable hood at its front end is secured to the front edge portion of a front windshield. While the vehicle is running at a high speed with the foldable hood remaining folded, a violent wind directly toward the compartment is blocked by the front windshield. However, the height of the windshield is restricted for the vehicle in order to reduce the resistance of the air during running and to provide a good external appearance, so that there is a problem that an air flow deflected upward back by and passing over the windshield partly turns into a downward and turbulent flow around the rear body section and is directed forward toward the passenger compartment from the rear body section.

In order to eliminate this problem, it has been proposed, for instance, to install what is called a windbreak aero-board apparatus or wind shield apparatus behind the passenger seats in the vehicle which transversely extends with its top edge leveled with a side belt line. The wind shield member of the windbreak aero-board apparatus is made of a rigid panel member so as to prevent a swirling wind flowing from the back of the passenger compartment. The wind shield member is retractably mounted on a vehicle floor panel by a support device so as to swing forward down from an upright position to a retracted position. In the upright position, the wind shield member projects upward beyond the side belt lines to block the wind blast into the passenger compartment. In the retracted position, the wind shield member is placed below the side belt line to allow the wind blast to flow forward into the passenger compartment.

One of this type of wind shield members placed behind the passenger seats so as to be pivotally swung between the upright position and the retracted position is disclosed in, for example, Japanese Utility Model Publication No. 4-5372.

In the prior art wind shield structure such as described in the above mentioned publication, the vehicle floor panel includes a front floor panel, a wall panel and a rear panel. The wall panel extends upward from a rear end of the front panel and the rear panel extends rearward from an upper end of the wall panel. The supporting device supports an upper end of the wind shield member so that it is positioned along the wall panel when the wind shield member is in the retracted position. However, in the prior art structure, it is complicated to swing the wind shield member from the retracted position to the upright position and vice versa. A certain height is necessary for the wind shield member so that the shield member effectively prevents the swirling wind blast. Therefore, the seats located in front of the wind shield member have to be slid forward to the position in which the swing of the wind shield member is not disturbed before reaching the retracted position or to the upright position.

In order to evade the complexity, the wind shield member can be designed so as to swing rearward from the upright position and positioned along the rear panel when it is in the retracted position. In this structure, the wind shield member is interfere with the roof structure which is folded on the rear panel. When the vehicle is provided with a foldable roof structure with a rear glass built therein, the rear glass might be damaged.

SUMMARY OF THE INVENTION

It is therefore an object of the invention to provide a foldable windbreak aero-board apparatus for an open-top vehicle in which a swirling wind blast directed forward toward the passenger compartment from the rear body section of the vehicle body is be prevented.

It is another object of the invention to provide a foldable windbreak aero-board apparatus which has a height sufficient to prevent a swirling wind blast in its unfolded position and is easily retracted to a retracted position.

It is still another object of the invention to provide a foldable windbreak aero-board apparatus which does not reduce the passenger rear view range even in the unfolded position.

It is further object of the invention to provide a foldable windbreak aero-board apparatus which provides a lot of latitude in designing a vehicle body having a good external appearance.

The above objects are accomplished by providing a foldable windbreak aero-bord apparatus which is disposed behind a passenger seat of an open-top vehicle to protect a passenger on the seat from a swirling wind blast. The foldable windshield aero-board apparatus comprises a lower shield member transversely extending in a vehicle body and secured to opposite sides of the vehicle body and an upper shield member transversely extending in the vehicle body. The upper shield member is connected to the lower shield member by means of a hinge means to turn between an upright position in which the upper shield member stands up on top of the lower shield member and a retracted position in which the upper shield member is placed below the top of the lower shield member.

Either one of the lower and upper shield members is formed with a cutout and the other is formed with a jut mating with the cutout so that the one shield member support the hinge shaft in the cutout.

Connecting means including a hinge shaft is supported by either one of the lower and upper shield members to connect the one to the other so that the upper shield member pivotally turn up and down between the upright position and retracted position. In the upright position the upper shield member is placed behind or front of the lower shield member to overlap almost completely the lower shield member.

The connecting means may cooperate with a retainer to retain the upper shield member immovably upright in the upright position. Further, a pressing means such as made of a resilient member may be incorporated between the lower and upper shielding members to shove the top of the lower shield member and the bottom of the upper shield member against each other so as thereby to assist the upper shield member to remain upright.

The windbreak aero-board apparatus may preferably have a folded height almost even with the belt line defined by the side doors of the vehicle, which always provides a good external appearance.

According to the windbreak aero-board apparatus, the upper shield member in the upright position prevents the passenger from suffering a strong swirling wind blast laterally and/or from the back while driving at a high speed and in the retracted position yields a spacious feeling and an improved passenger rear view. The connecting means, in particular when cooperating with the retaining means, holds the upper shield member immovably upright while traveling at a high speed.

BRIEF DESCRIPTION OF THE DRAWINGS

The above and other objects and features of the present invention will become apparent from the following description of the preferred embodiment when considering in conjunction with the accompanying drawings, in which.

DESCRIPTION OF THE PREFERRED EMBODIMENTS

Figure 1:
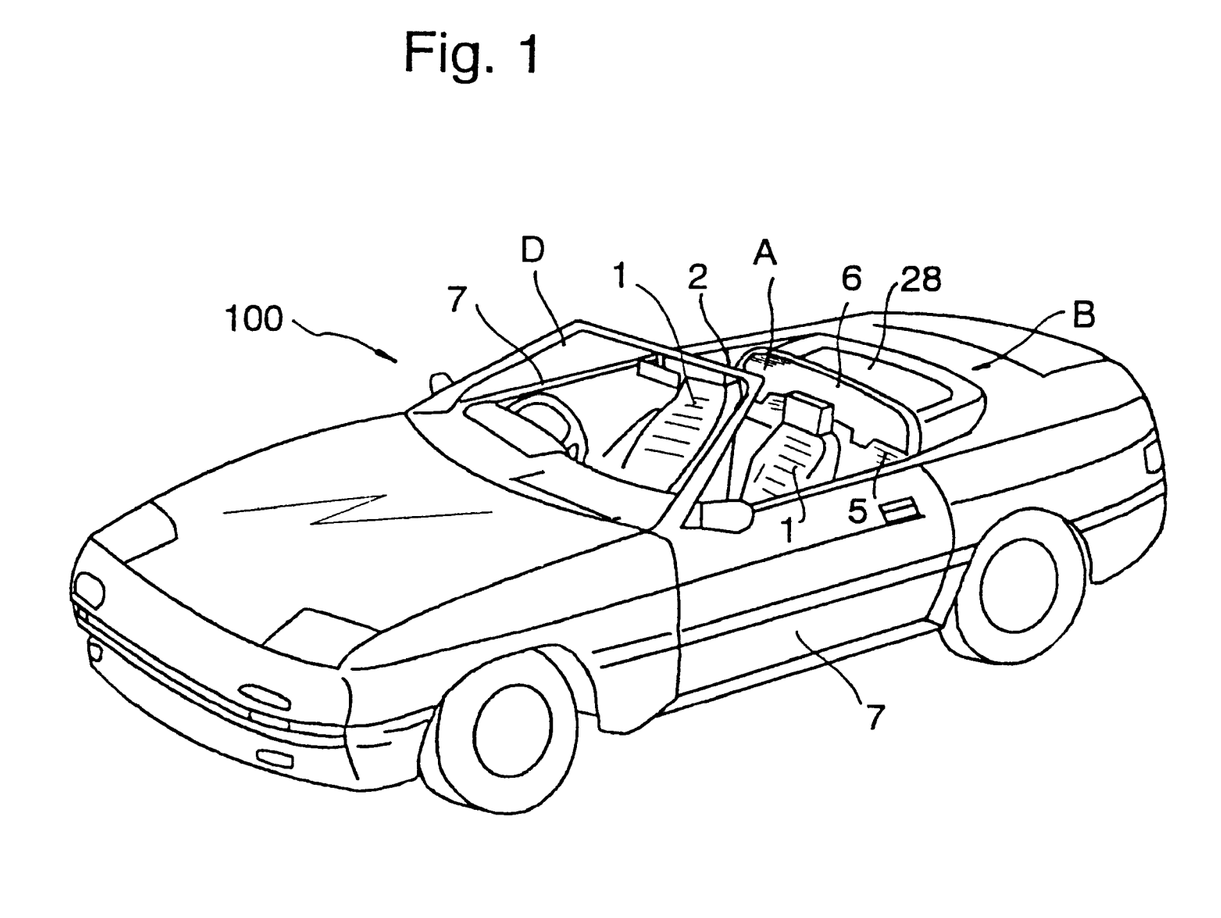
FIG. 1 is a schematic perspective view of an open-top vehicle equipped with a windbreak aero-board apparatus in accordance with an embodiment of the invention.
Figure 2:
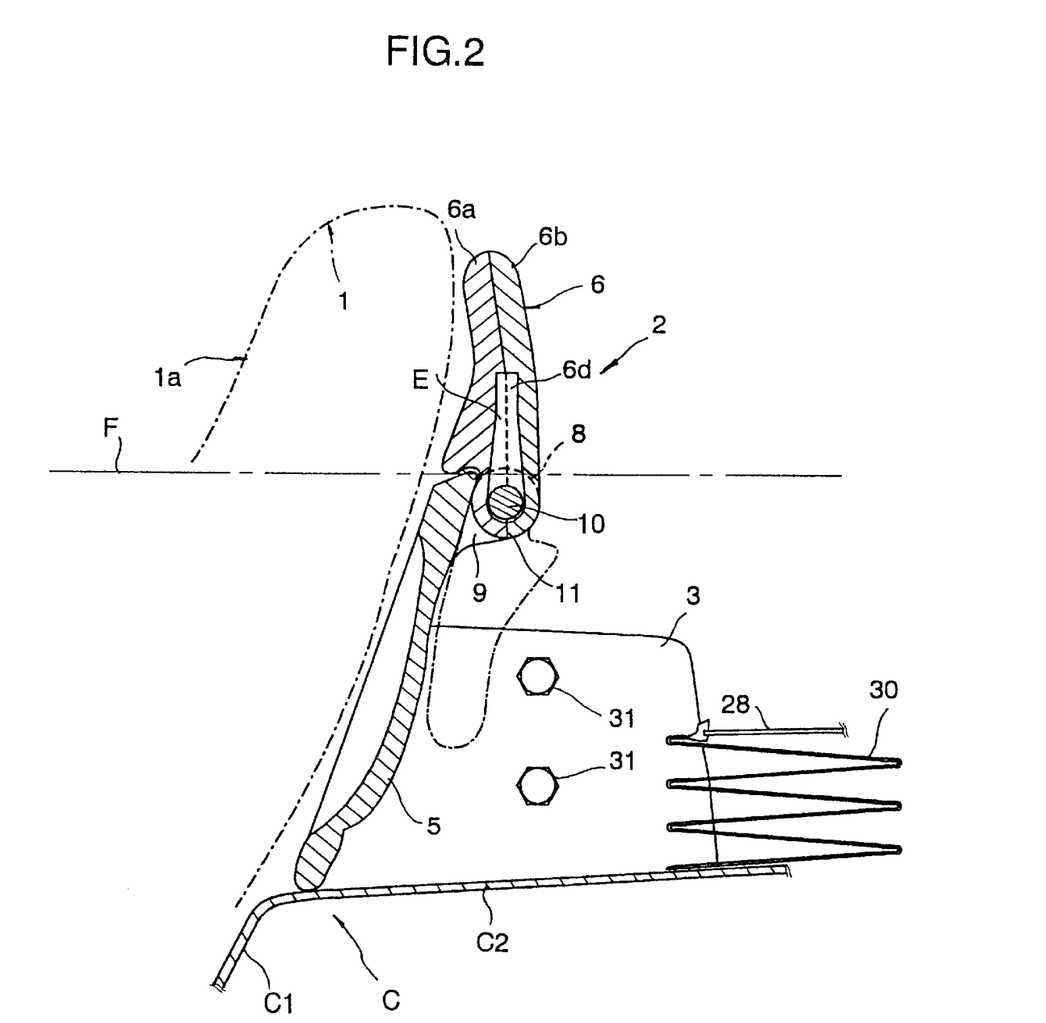
FIG. 2 is a cross-sectional view showing a windbreak aero-board apparatus in accordance with an embodiment of the present invention.

Referring now to the drawings in detail, and particularly to FIGS. 1 and 2 showing a convertible vehicle equipped with a windbreak aero-board apparatus in accordance with an embodiment of the invention, the vehicle 100 has a pair of passenger seats 1 disposed in a passenger compartment A and a windbreak aero-board apparatus or wind shield apparatus 2 disposed behind the passenger seats 1. The vehicle 100 is provided with a foldable hood B with a canvas top portion 30 and a rear windshield 28. The foldable hood B is folded and unfolded to open and cover the top of the passenger compartment A. The vehicle 100 also has a floor panel C forming part of a bottom portion of the passenger compartment A. The floor panel C is comprised of a front panel portion C3, a slanted wall portion C1 and a rear panel portion C2. The front panel portion is located and extends under the seats 1. The slanted wall portion C1 extends upwardly back from a rear end of the front panel portion. The rear panel portion C2 extends substantially horizontally back from an upper end of the slanted wall portion C1.

The vehicle 100 further has a front windshield D and a pair of side doors 7. The front windshield D defines the front end of the passenger compartment A. The side doors 7 define both sides of the passenger compartment A and a belt line F. The windbreak aero-board apparatus 2 is disposed right above the front end portion of the rear panel portion C2 and extends transversely from one side to the other of the vehicle. Specifically, the windbreak aero-board apparatus 2 is comprised of a lower shield member 5 and an upper shield member 6. The upper shield member 6 is disposed on the top of the lower shield member 5. The lower shield member 5 has a vertical height greater than that of the upper shield member 6. The upper shield member 6 is pivotally mounted to swing around a transverse shaft 10 at the lower end thereof. The lower shield member 5 and the upper shield member 6 are made of a rigid opaque resin member. The lower shield member 5 extents upwardly back from the front end portion of the rear panel portion C2 at the substantially same inclination as the slanted wall portion C1 so as to bump a seatback 1a of each seat 1 against the lower shield member 5 when the seat 1 is reclined backward. The upper shield member 6 is comprised of a front member 6a and a rear member 6b.

The lower shield member 5 is disposed in a manner that the top of the lower shield member 5 is almost even with a belt line F defined by the upper end of the side door 7. The upper shield member 6, as shown in FIG. 2, is capable of swinging behind the lower shield member between an upright position shown by a solid line and a folded position shown by a broken line. In the folded position, the upper shield member 6 is suspended downward from the pivot shaft 10 transversely extending along the upper back of the lower shield member 5. The upper shield member 6 at its top is lower than the top of each seat 1 by a certain extent even in the upright position so as not to block the passengers rear view.

Figure 3:
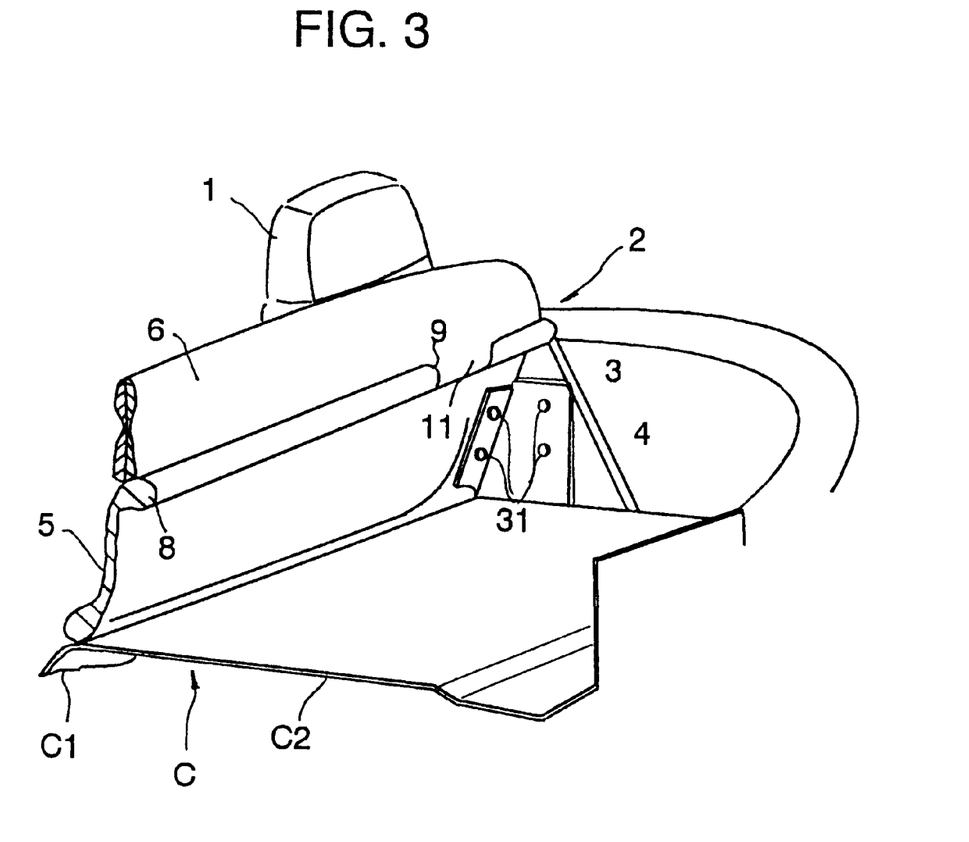
FIG. 3 is a schematic perspective view showing part of the windbreak aero-board apparatus shown in FIG. 2.
Figure 4:
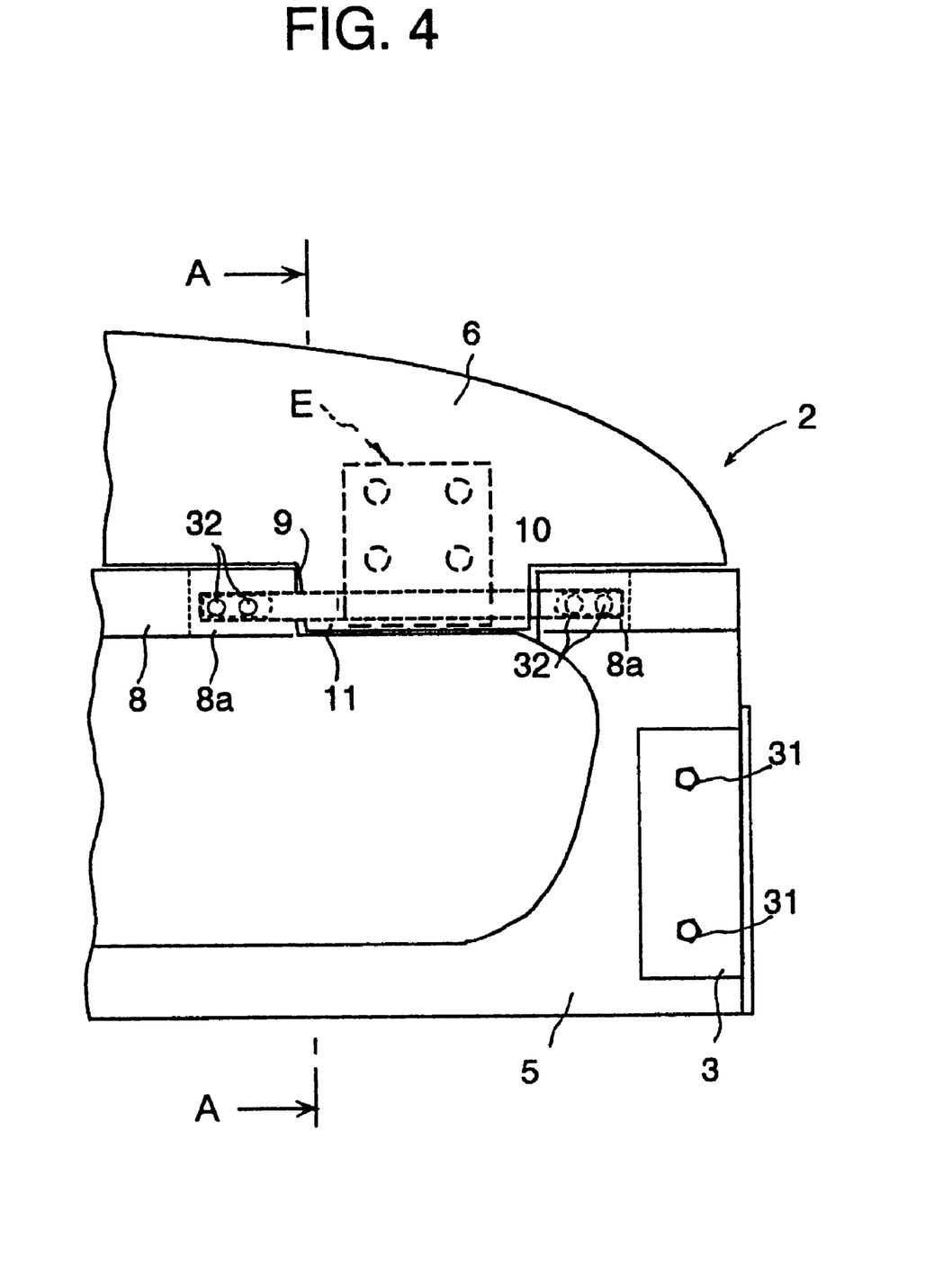
FIG. 4 is a rear view showing part of the windbreak aero-board apparatus shown in FIG. 2.

The lower shield member 5 is connected to the upper shield member 6 by means of two connecting devices E at opposite sides thereof. The connecting devices E ensures that the windbreak aero-board apparatus 2 in the upright position remains upright even when it is struck by a strong wind blast while traveling at a high speed. Both sides of the lower shield member 5 are secured to and supported by side members 4 forming part of a body structure of the vehicle through the brackets 3. The bracket 3 is secured to the side of the lower shield member 5 and the side structure of the vehicle 100 by means of fastening bolts 31. The lower shield member 5 includes an upper wall portion 8 jutting back from the top end thereof. The upper wall portion 8 includes a pair of cutouts 9 at the opposite sides thereof. The upper shield member 6 includes a pair of juts 11 complementarily meeting the cutouts 9, respectively. The front member 6a includes a cutout 6c in the jut 11. The rear member 6b also includes a cutout 6d in the jut 11. The connecting device E is disposed in a space provided between the cutout 6c of the front member 6a and the cutout 6d of the rear member 6b. The connecting device E is comprised of a hinge bracket 12, a shaft 10 and a clip 13. The hinge bracket 12 is fixed to the upper shield member 6. The shaft 10 is fixed to the lower shield member 5. The clip 13 connects the hinge bracket 12 and the shafts 10 to each other so that the upper shield member 6 can swing. Both shafts 10 are disposed in the cutouts 9 of the upper wall portion 8 respectively and are fixed to the upper wall portions 8 at both ends thereof 10 by means of bolts or screws 32. The hinge brackets 12 are disposed in the juts 11 respectively and are fixed to the front member 6a of the upper shield member 6 by means of bolts or screws 33. A cover 8a is attached to the upper wall portion 8 so as to hide the ends of the shaft 10.

Figure 5:
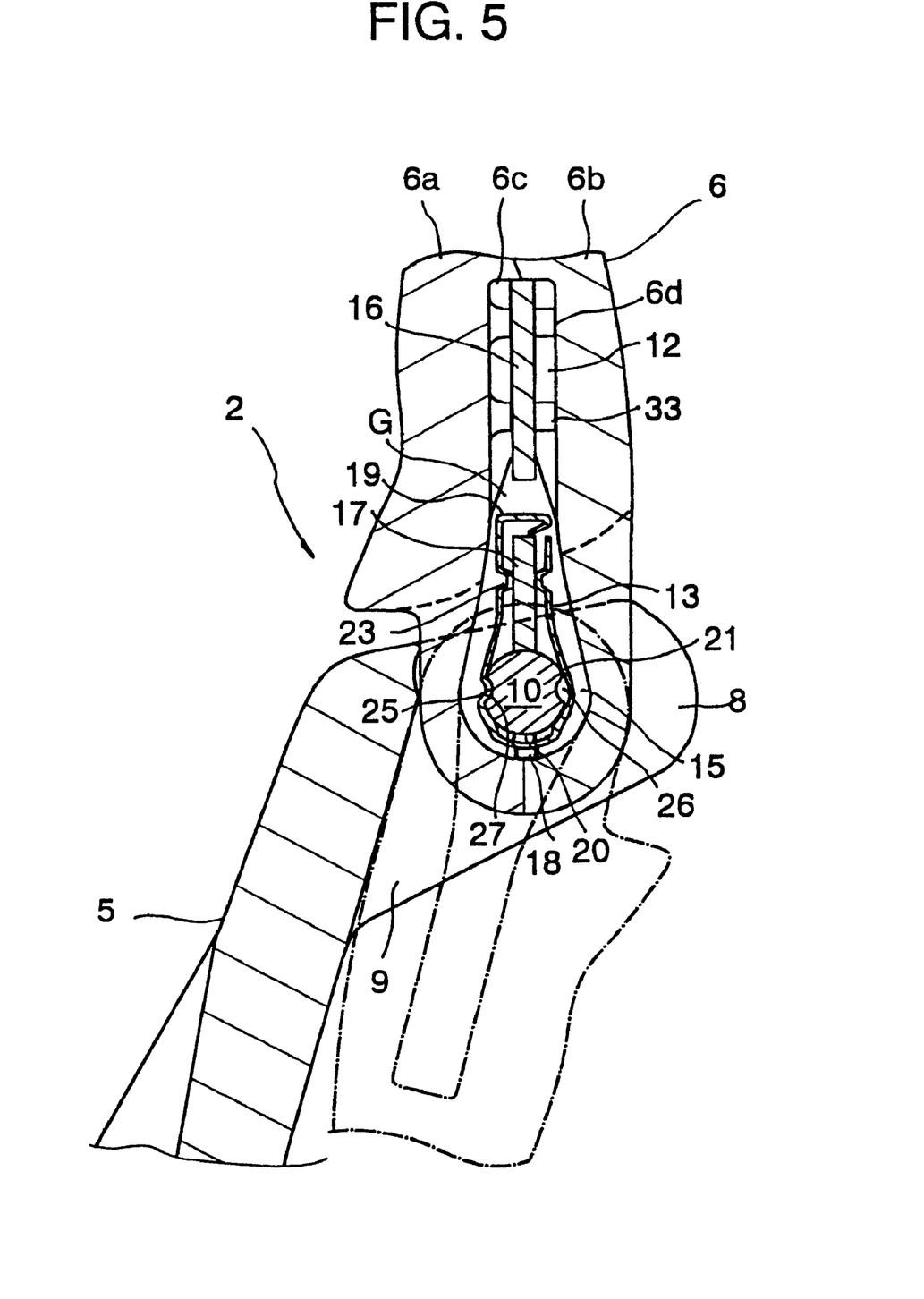
FIG. 5 is a cross-sectional view of the windbreak aero-board apparatus of FIG. 4 taken along a line A—A.
Figure 6A:
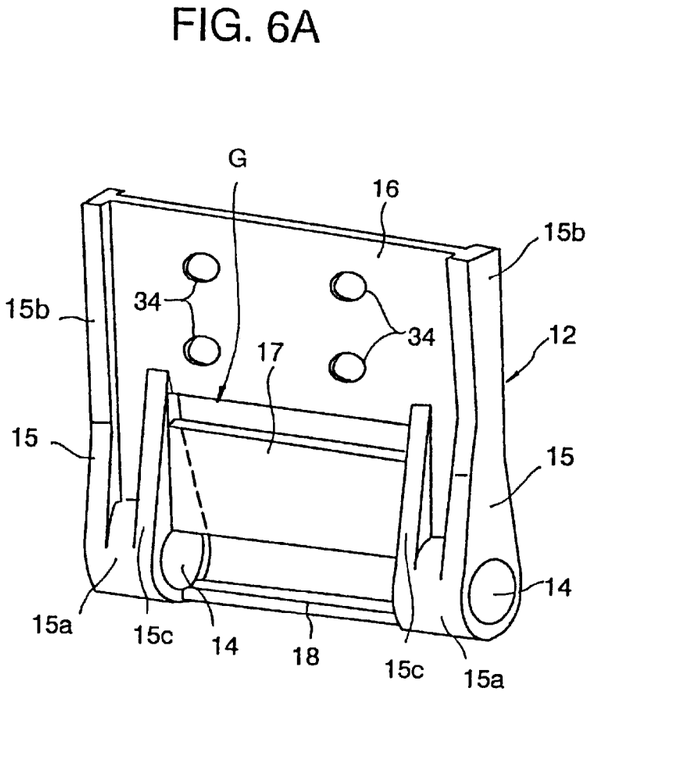
FIG. 6A is a schematic perspective view showing a hinge bracket of the windbreak aero-board apparatus shown in FIG. 2.
Figure 6B:
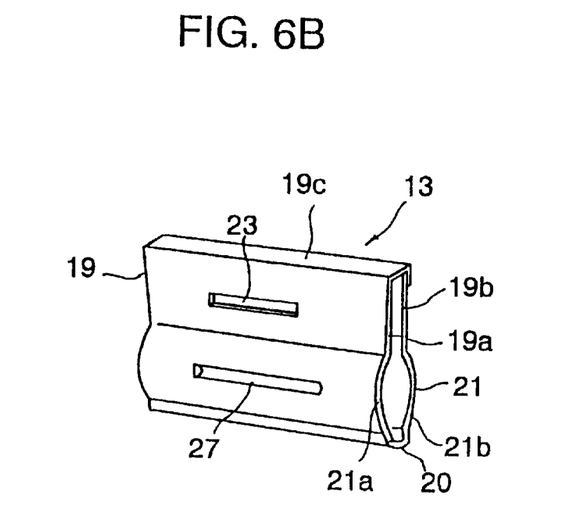
FIG. 6B is a schematic perspective view showing a holder spring of the windbreak aero-board apparatus shown in FIG. 2.

As shown in the FIGS. 5, 6A and 6B, the hinge bracket 12 is structured by two bosses 15 and three connecting plates 16, 17 and 18 connecting with the bosses 15. The boss 15 has a pipe portion 15a, a first plate portion 15b and a second plate portion 15c. The pipe portion 15 has a bore 14 into which the shaft 10 is inserted. The first plate portion 15b extends from one end of the pipe portion 15a in a direction perpendicular to the central axis of the bore 14. Similarly, the second plate portion 15c extends from the other end of the pipe portion 15a in a direction perpendicular to the central axis of the bore 14. The first plate portion 15b is longer than the second plate portion 15c. The first connecting plate 16 connects both first plate portions 15b. The second connecting plate 17 connects both second plate portions 15c. The third connecting plate 18 connects both pipe portions 15a at the opposite sides across the bore 14 from the second connecting plate 17. There is provided a gap G between the first connecting plate 16 and the second connecting plate 17. The first connecting plate 16 includes four holes 34 for insertion of the bolts or screws 33.

The clip 13 is formed by a first clamping portion 19, a second clamping portion 21 and a third clamping portion 20. The clip 13 is formed by bending a single metal sheet such as a steel sheet. The first clamping portion 19 has a pair of clamping portions 19a and 19b. The opposing surface of the clamping portions 19a and 19b include a pair of jaws 23 formed by cutting a pair of tongues on either side of the clamping pieces 19a and 19b and bending inward in the case of the clamping portions 19a and 19b. Additionally one of the clamping portions 19a includes a U-shaped portion 19c. When the clip 19 is assembled to the connecting device E, the U-shaped portion 19c is opened and the U-shaped portion 19c passes though the gap G. Thus, when the first connecting plate 16 is interposed between the first clamping portion 19, the jaws 23 are engaged by the side surfaces of the first connecting plate 16 and one end of the U-shaped portion 19c is engaged by the end surfaces of the first connecting plate 16. The second clamping portion 21 is formed by a pair of clamping portions 21a and 21b. Both clamping portions 21a and 21b are curved. When the clip 13 is assembled to the connecting device E, clamping portions 21a and 21b of the second clamping portion 21 hold the shaft 10. The third clamping portion 20 has a U-shaped portion and holds the third connecting plate 18. Additionally, the front clamping portion 21a of the second clamping portion 21 has a circular-arcuate concave portion 27. The front side of the shaft 10 has a first circular-arcuate concave portion 25 at its front side and a second circular-arcuate concave portion 26. These circular-arcuate concave portions 25, 26 and 27 are almost the same in size. The circular-arcuate concave portion 27 of the second clamping portion 21 is engaged with either the first concave portion 25 or the second concave portion 26. When the upper shield member 6 is in the upright position shown by a solid line, the circular-arcuate concave portion 27 of the second clamping portion 21 is engaged with the first circular-arcuate concave portion 25. By means of turning the upper shield member 6 around the central axis of the shaft 10 backward from the upright position, the clamping portions 21a and 21b of the second clamping portion 21 are elastically deformed and the engagement between the circular-arcuate concave portion 27 of the second clamping portion 21 and the first circular-arcuate concave portion 25 are released. Further, when the upper shield member 6 reaches the retracted position shown by a broken line, the circular-arcuate concave portion 27 of the second clamping portion 21 is engaged with the second circular-arcuate concave portion 26. The upper shield member 6 easily remains stable in the upright position through the engagement between the circular-arcuate concave portion 27 of the second clamping portion 21 and the first circular-arcuate concave portion 25 of the shaft 10. Similarly, the upper shield member 6 remains stable in the retracted position through the engagement between the circular-arcuate concave portion 27 of the second clamping portion 21 and the second circular-arcuate concave portion 26 of the shaft 10.

Figure 7:
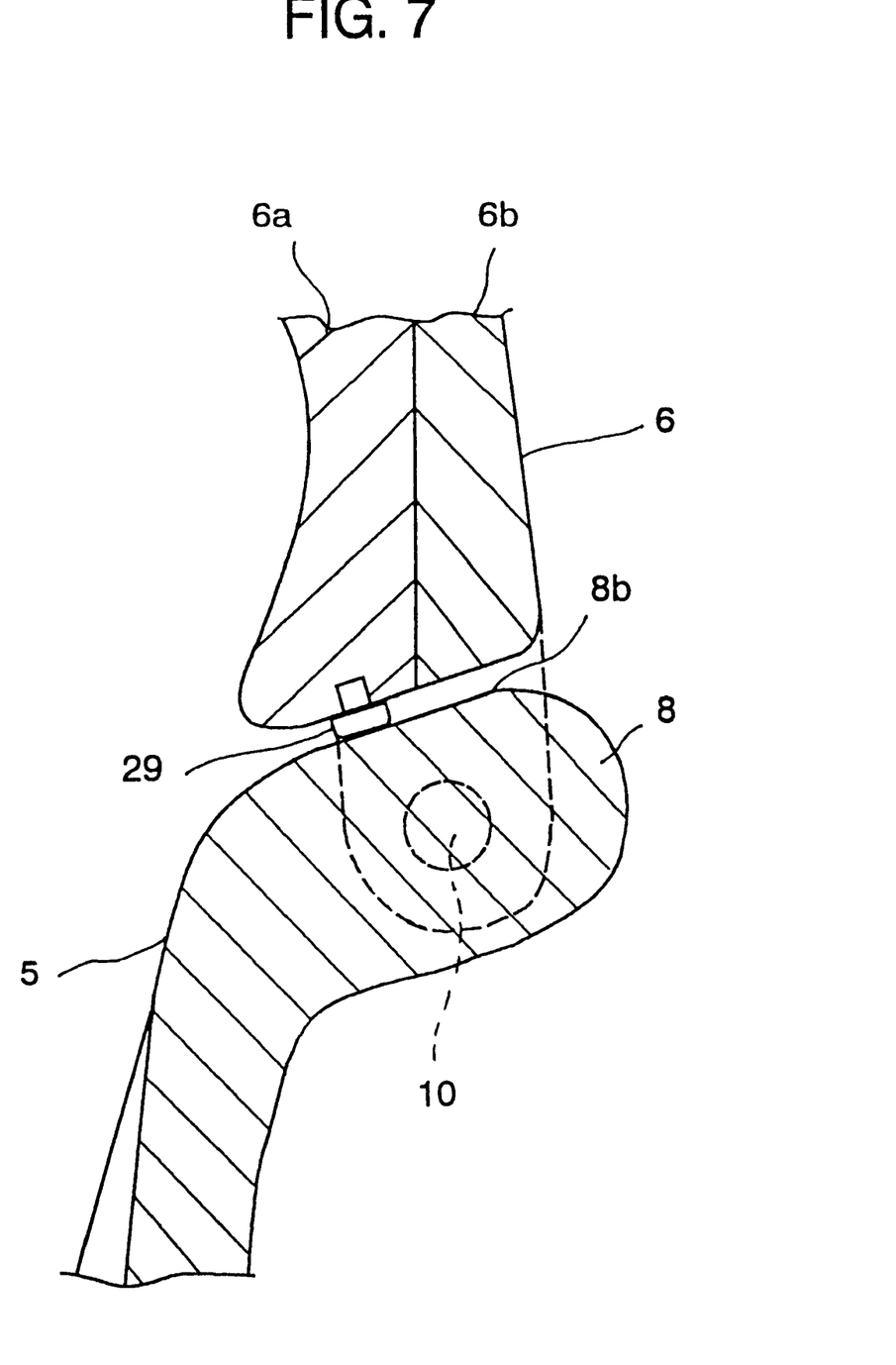
FIG. 7 is a cross-sectional view showing part of the windbreak aero-board apparatus.

As shown in the FIG. 7, the upper shield member 6 has a contact member 29 made of an elastic body like rubber. When the upper shield member 6 is in the upright position, the contact member 29 contacts the upper face 8b of the upper wall portion 8. The upper shield member 6 remains more stable in the upright position. Further, when the upper shield member 6 is in the upright position while the vehicle 100 is traveling at a high speed, the contact member 29 prevents the upper shield member 6 from vibrating.

In retracting the upper shield member 6, as the upper shield member 6 is turned around the shaft 10 arranged on the upper end of the lower shield member 5, it is not necessary to shift the seats 1 forward or incline the seatback 1a forward down. In the case where the upper shield member 6 is in the upright position while the vehicle 100 is running, the windbreak aero-board apparatus 2 protects the passenger from suffering a swirling wind blast introduced from the back of the passenger compartment A. Further, when the upper shield member 6 is in the retracted position, the windbreak aero-board apparatus 2 does not block the passenger's rear view. Because of the top of the lower shield member 5 is almost even with the side belt lines F defined by the upper sides of the side doors 7 and the top of the shield member 5 in the retracted position is almost even with the belt lines F, the vehicle has a good external appearance when the upper shield member 6 is in the retracted position.

In this embodiment, the connecting device E is attached to the shield members 5 and 6 according to the following steps.

The hinge bracket 12, the shaft 10 and the clip 13 are previously assembled into the connecting device E. After fixing the hinge bracket 12 to the front member 6a of the upper shield member 6 by means of four bolts 33, the front and rear side members 6a and 6b are adhered together by friction welding. Subsequently, the shaft 10 at opposite ends is fixed to the upper wall portion 8 of the lower shield member 5 by means of four bolts 32. Lastly, the cover 8a is attached to the upper wall portion 8 so as to hide heads of the bolts 32 and the ends of the shaft 10.

As the connecting device E is enclosed within the shield member 6, the windbreak aero-board apparatus 2 has a good external appearance.

Although the present invention has been described in term of a specific embodiment thereof, it is possible to modify and alter details thereof without departing from the spirit of the present invention. For instance, the upper wall portion 8 may includes a pair of protrusions at the sides of the upper wall portion 8. The upper shield member 6 may include a pair of cutouts so as to receive the cutouts respectively. Further, the shaft 10 may be fixed to the upper shield member 6. The windbreak aero-board apparatus 2 may be constructed so that the upper shield member 6 turns forward down around the shaft 10 from the upright position and is mounted for slide movement to the lower shield member 5.

What is claimed is:

1. A windbreak aero-board apparatus for an open-top vehicle equipped with a folded top hood protecting a passenger seating on a passenger seating from a swirling wind blast, said passenger seat being positioned before a substantially vertical wall panel by which a substantially horizontal front panel portion and a substantially horizontal rear panel portion are connected at different levels to form a floor panel of a vehicle body of the open-top vehicle and said folded top hood being disposed on said substantially horizontal rear panel portion, said windbreak aero-board apparatus for the open-top vehicle equipped with the folded top hood comprising:

a lower shield member disposed behind said vertical wall panel portion and above said rear panel portion and transversely extending in the vehicle body, said lower shield member being fixedly connected to opposite sides of the vehicle body;

an upper shield member disposed on the top of said lower shield member and transversely extending in the vehicle body, said upper shield member being smaller in height than said lower shield member; and hinge means including a hinge shaft for connecting said upper shield member and said lower shield member to each so as to permit said upper shield member to pivotally turn between an upright position in which said upper shield member stands up on the top of said lower shield member and a retracted position in which said upper shield member is placed at the back of said lower shield member;

where said upper shield member has a height such that it does not come across said folded top hood while turning down to said retracted position.

2. The windbreak aero-board apparatus as defined in claim 1, and further comprising a retaining means for retaining said upper shield member in said upright position.

3. The windbreak aero-board apparatus as defined in claim 2, wherein said retaining means retains said upper shield member in said retracted position.

4. The windbreak aero-board apparatus as defined in claim 1, and further comprising pressing means disposed between said lower shield member and said upper shield member in said upright position for forcing said top of said lower shield member and an bottom of said upper shield member to press against each other so as to assist said upper shield member to remain upright.

5. The windbreak aero-board apparatus as defined in claim 1, wherein one of said lower shield member and said upper shield member is formed with a cutout and supports said hinge shaft in said cutout and another of said lower shield member and said upper shield member is formed with a jut mated to said cutout.

6. The windbreak aero-board apparatus as defined in claim 1, wherein said hinge shaft is disposed at a vertical level even with a belt line of the vehicle body.

* * * * *